US006912071B1

(12) United States Patent
Rasmussen et al.

(10) Patent No.: US 6,912,071 B1
(45) Date of Patent: Jun. 28, 2005

(54) VIRTUAL TECH REP BY REMOTE IMAGE QUALITY ANALYSIS

(75) Inventors: D. Rene Rasmussen, Pittsford, NY (US); Edul N. Dalal, Webster, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/450,185

(22) Filed: Nov. 29, 1999

(51) Int. Cl.[7] .................................................. H04N 1/00
(52) U.S. Cl. ........................ 358/406; 358/401; 382/112
(58) Field of Search ................................ 358/401, 406, 358/296, 504, 440; 382/112, 286, 287

(56) References Cited

U.S. PATENT DOCUMENTS

| 4,071,911 | A | * | 1/1978 | Mazur ............................ 700/1 |
| 4,086,434 | A | * | 4/1978 | Bocchi ....................... 379/91.1 |
| 4,583,834 | A | * | 4/1986 | Seko et al. ..................... 399/8 |
| 5,038,319 | A | * | 8/1991 | Carter et al. .................... 714/2 |
| 5,057,866 | A | * | 10/1991 | Hill, Jr. .......................... 399/8 |
| 5,084,875 | A | * | 1/1992 | Weinberger et al. ........... 714/46 |
| 5,365,310 | A | * | 11/1994 | Jenkins et al. .................. 399/8 |

(Continued)

FOREIGN PATENT DOCUMENTS

EP   0 854 632 A2 *  7/1998   ............. H04N/1/32

OTHER PUBLICATIONS

Remote Diagnostics System, paul Morgan, Xerox Disclosure Journal, vol. 3, No. 3, May/Jun. 1978, pp 191–192.*
Event –Based architecture for real–time fault diagnosis, Real Time Fault Monitoring of Industrial Processes, A.D. Pouliezo & G.S. Staverakakis, Kluwar Academic Publishers, 1994, pp. 284–287.*
Fault Diagnosis in dynamic Systems Using Analytical and Knowledge–based Redundancy—A Survey and Some New Results, Paul M. Frank, Automatica, vol. 26, 90 International Federation of Automatic Control, 1990, pp. 459–474.*
Combining Expert System and Analytical Redundancy Concepts for Fault–Tolerant Flight Control, David A. Handelman and Robert F. Stengel, Princeton University, J. Guidance, vol. 12, No. 1, Jan.–Feb. 1989, pp. 39–45.*
D. Ting, "IQ Analysis Engine Technical Overview", *IQ Data Systems*, Draft Version 0.9, (1999).

*Primary Examiner*—Mark Wallerson
(74) *Attorney, Agent, or Firm*—Oliff & Berridge, PLC (57) ABSTRACT

A virtual tech rep system that can assist in reducing service call visits and customer complaints by readily analyzing image quality of an output image device, such as a copier or printer. The system generates a hardcopy test pattern output from the copier or printer and then scans the test pattern using either the platen of the digital copier or an external scanner to form a digital raster image. Test targets in the digital raster image are then determined using pattern recognition software and image quality analysis is then performed on the test targets based on the sensitivity of the human visual system. It is preferable that the image quality analysis is based on human vision systems rather than a direct comparison between original and printed images as many differences may go unnoticed by a human viewer whereas other types of differences may be readily noticed, even if only slight. The system optionally sends the test results and possibly part or all of the scanned test pattern to a service or diagnostic facility (remote or local) for further analysis when potential defects are identified. This process may be performed at start-up or automatically initiated after a predetermined number of operating cycles or hours of use have been attained.

23 Claims, 7 Drawing Sheets

U.S. PATENT DOCUMENTS

| | | | | |
|---|---|---|---|---|
| 5,416,613 A | * | 5/1995 | Rolleston et al. | 358/518 |
| 5,510,876 A | * | 4/1996 | Hayashi et al. | 399/1 |
| 5,510,896 A | | 4/1996 | Wafler | |
| 5,612,902 A | * | 3/1997 | Stokes | 702/85 |
| 5,619,307 A | * | 4/1997 | Machino et al. | 399/11 |
| 5,642,202 A | * | 6/1997 | Williams et al. | 358/406 |
| 5,680,541 A | * | 10/1997 | Kurosu et al. | 714/26 |
| 5,694,528 A | * | 12/1997 | Hube | 358/1.14 |
| 5,748,221 A | * | 5/1998 | Castelli et al. | 347/232 |
| 5,760,913 A | * | 6/1998 | Falk | 382/167 |
| 5,884,118 A | * | 3/1999 | Mestha et al. | 399/15 |
| 6,023,525 A | * | 2/2000 | Cass | 382/162 |
| 6,023,595 A | * | 2/2000 | Suzuki et al. | 399/31 |
| 6,052,809 A | * | 4/2000 | Bowden | 714/738 |
| 6,275,600 B1 | * | 8/2001 | Banker et al. | 382/112 |
| 6,404,517 B1 | * | 6/2002 | Chao | 358/504 |
| 6,512,845 B1 | * | 1/2003 | Haikin et al. | 382/165 |

* cited by examiner

VIRTUAL TECH REP BY REMOTE IMAGE QUALITY ANALYSIS

BACKGROUND OF THE INVENTION

1. Field of Invention

The invention relates to a virtual tech rep system that can perform in-field evaluation of printer and copier image quality automatically and communicate with a remote service department if warranted.

2. Description of Related Art

It is well known that customer satisfaction can be improved and maintenance costs reduced if problems with copiers and printers can be fixed before they become serious enough to warrant a service call by the customer. While current technology exists to enable printers and copiers to call for service automatically when sensors detect certain operating parameters outside of permissible ranges, there is not a very comprehensive manner of detecting incipient system failure or automatically diagnosing when problems with image quality reach a level where human observers perceive a reduction in quality. This is caused not only by the large number of operating parameters that would need to be tracked, but also because these parameters are strongly coupled to one another. That is, a given parameter at a certain value may or may not be a problem depending on the values of other parameters. While existing systems provide some level of image quality analysis, these systems have been found less than satisfactory as image quality determination is machine dependent and may be inconsistent with perceptions of image quality by human users.

SUMMARY OF THE INVENTION

There is a need for image output devices, such as printers and copiers, to better self-diagnose problems relating to image quality. Applicants have found that to comprehensively and reliably measure the system performance of a printer or copier, the image quality of the output must be measured. More importantly, this image quality analysis should utilize models of the human visual system (HVS) such that not only physical characteristics of the image are analyzed, but the degree to which differences in certain image quality traits are perceived by human observers can be determined and taken into account when deciding which, if any, action to take. Automated determination of image quality can also provide value to users of the printer in other ways than through self-diagnosis, for example as a tool of automating the monitoring of image quality as part of a quality assurance operation.

One exemplary embodiment of the systems and methods of the invention overcomes such problems by developing powerful diagnosing tools within a digital printer or copier for self-diagnosis and evaluation of image quality. In this embodiment, the system combines four essential elements and one optional element, which can form an integral part of or be associated with a digital copier, printer, or multifunction device (scanner/printer/copier/fax). These five elements include: one or more digital test patterns with locator marks stored in memory (or hard copy test patterns) for providing one or more hard copy output test images; an input scanner that can scan the hard copy test image to form a digital raster image; pattern recognition software that receives the digital raster image of the test image and automatically detects the locator marks (fiducial marks) to determine the exact position of the content of the test pattern on the digital raster image; an image quality analysis module that receives information about the position of the content of the test pattern on the digital raster image and produces test results including both physical characteristics of the image and results that quantify different aspects of the image quality as perceived by human observers; and optionally a communication module that is capable of contacting a service department or a more sophisticated diagnostic module, and provide all or selected results from the image quality analysis module, if further analysis or service is necessary.

Image quality analysis can be performed to monitor many aspects of the printed output of the printing system, such as color registration, motion quality, micro and macro uniformity, color correction, and text quality as non-limiting examples. This analysis is performed using models of human visual perception so that those differences that would be perceived by a human observer are determined. Moreover, the results of the image quality analysis are preferably made to be independent of the marking technology so results can be compared across product and model lines with a standard system of measurement and evaluation, regardless of the particular printer being tested or the scanner used to generate the digital raster image from the output of the printer.

Once the image quality analysis module has completed its testing, the communication module may send the test results to a service department, and may also send a portion of the digital raster image to the service department when a problem has been detected. At this point, the service department can further diagnose the problem and decide what action, if any, to take. Alternatively, should no image quality problems be uncovered, the machine may continue to operate as usual without the need to send the service department a copy of the test results.

Similar functionality could be achieved by having the image quality analysis module reside at a remote location, such as the remote service department, allowing one image quality analysis module to analyze a large network of printers, copiers or other printing or reprographic systems. This is particularly useful when low level printers/copiers are being tested that may not have the necessary processing or memory capabilities to operate and house the image quality analysis module. However, this would require sending the digital raster image to the remote service department, which would require a relatively large bandwidth and long transmission time since a typical digital raster image could approach 80 megabytes in size.

In another exemplary embodiment of the systems and methods of the invention, the system, including the image quality analysis module, can further include a local expert system residing on the printer or copier itself or residing on a local personal computer (PC) connected to the printer or copier. The expert system receives the image quality test results and, based on these results and status of various sensors and hardware on the copier machine, determines a likely failure mode that caused the degradation of image quality and possible remedies to restore the quality to its intended level. Additionally, an even more sophisticated diagnostic expert system may be provided at the remote service station with the local expert system attempting diagnosis, and in those instances where diagnosis cannot be performed, only small image regions of interest can be transmitted to the remote expert system to reduce transmission expense.

According to an exemplary method according to the invention, the virtual tech rep system: generates a hardcopy test pattern output from the copier or printer; scans the test pattern using either the platen of the digital copier or an external scanner to form a digital raster image; identifies test targets in the digital raster image using pattern recognition software; performs image quality analysis on the test targets including such analysis which is based on human vision models; and optionally sends the test results and possibly part or all of the scanned test pattern to a service or diagnostic facility (remote or local) for further analysis, either on a routine basis or when potential defects are identified. This process may be performed at start-up or automatically initiated after a predetermined number of operating cycles or hours of use have been attained. Often, it may be desirable to repeat this sequence several times with different test patterns to test various image quality traits to obtain an overall image quality determination.

In an alternative application of the invention, the results from the image quality analysis module are not exclusively used for diagnostic purposes, but are provided to the printer user, and/or to a service department, as a means of monitoring the quality level of the output from the printer, for example for the purpose of quality assurance. The output from the image quality module may be provided in the form of hardcopy output, a digital file, or as records stored in a database system.

DETAILED DESCRIPTION OF PREFERRED EMBODIMENTS

Figure 1:
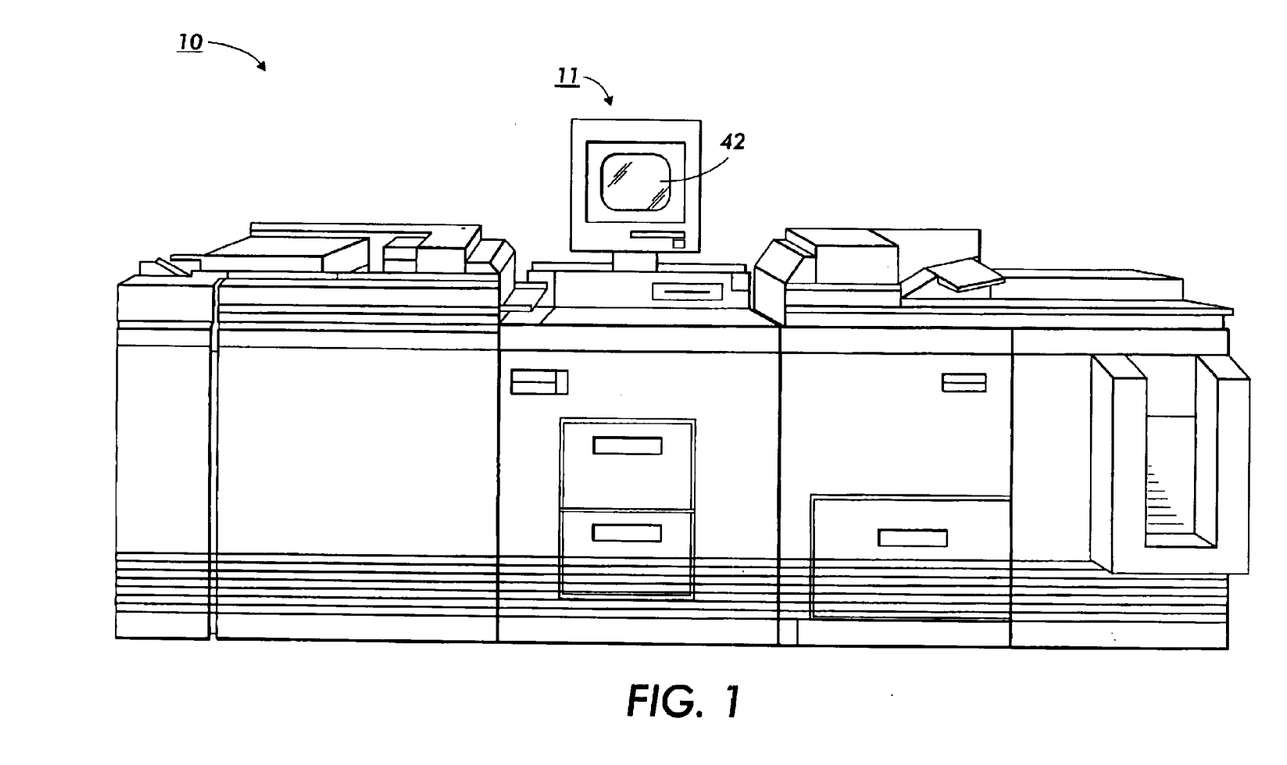
FIG. 1 shows a typical digital copier machine having a user interface suitable for use with the invention.

An exemplary device to which automatic image quality analysis is to be performed will be described with reference to FIGS. 1–3. FIG. 1 shows a digital copier machine 10 comprising a plurality of programmable components and subsystems which cooperate to carry out copying or printing jobs programmed through a touch dialog screen 42 of a user interface (UI) 11. Internal operating systems of the digital copier 10 are disclosed in U.S. Pat. Nos. 5,038,319, 5,057,866, and 5,365,310, owned by the assignee of the present invention, the disclosures of which are incorporated herein by reference in their entirety. As such, no further detailed description thereof is necessary. Digital copier 10, however, is merely representative of a preferred printing system to which the image quality determination is made. It should be understood that a loosely coupled printing or reproducing system is also applicable for use with the invention described herein, such as a printer or facsimile device. Moreover, while there may be benefits to use of the image quality analysis on a reproduction system, such as a digital copier having an integral scanner component, the invention also is applicable to a printer used in conjunction with a stand-alone scanner, such as a flatbed type scanner.

Figure 2:
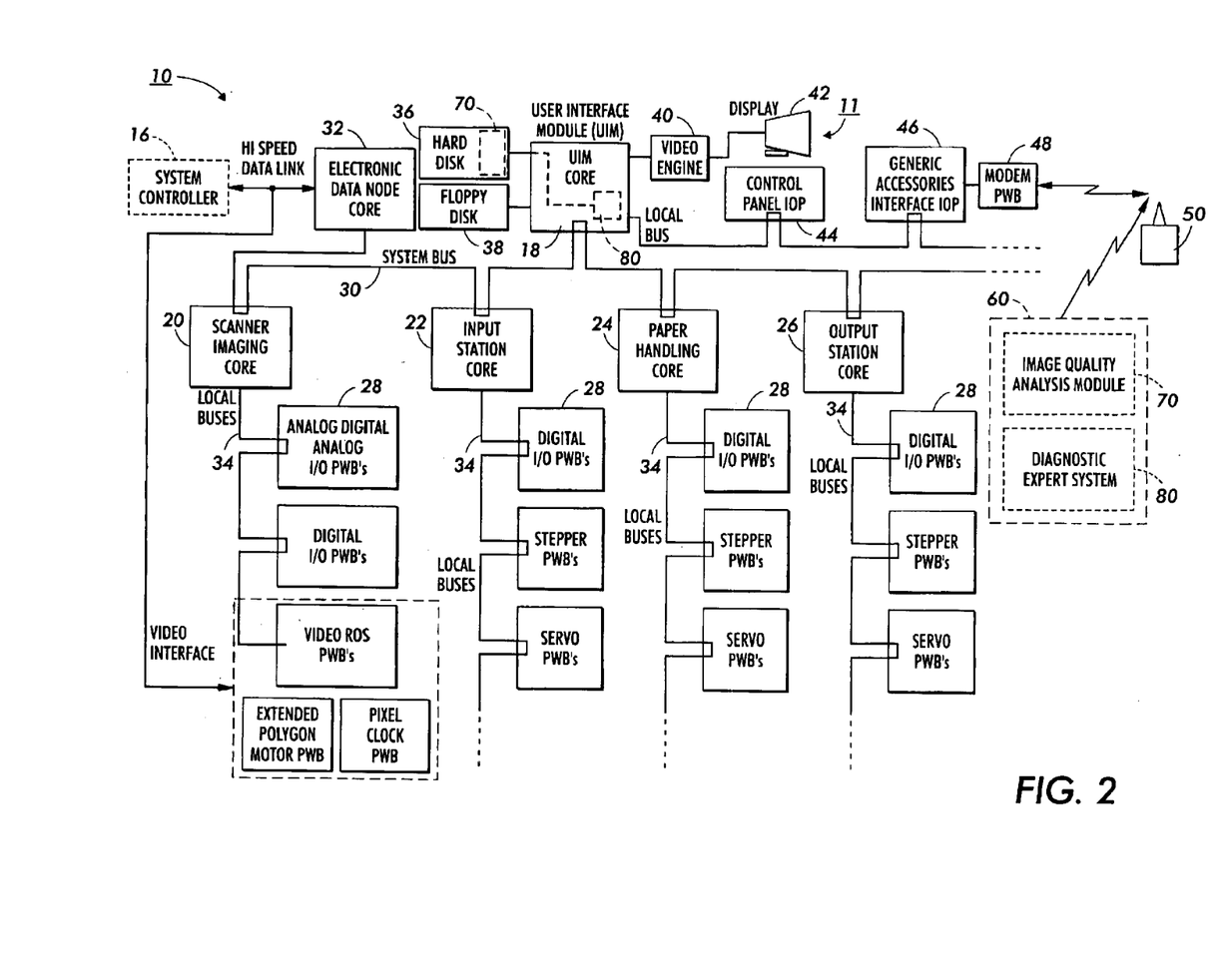
FIG. 2 is a schematic diagram of a digital copier having a user interface for communicating with a remote diagnostic computer.

Referring to FIG. 2, operation of the various components of exemplary digital copier 10 is regulated by a control system which uses operating software stored in memory in the system controller 16 to operate the various machine components in an integrated fashion to produce copies and prints. The control system includes a plurality of printed wiring boards (PWBs), there being a user interface module (UIM) core PWB 18, a scanner/imaging core PWB 20, an input station core PWB 22, a paper handling core PWB 24 and an output station core PWB 26, together with various input/output (I/O) PWBs 28. A shared line (SL) 30 couples the core PWBs 18, 20, 22, 24 and 26 with each other and with the electronic data node core 32, while local buses 34 serve to couple the PWBs to the respective cores and to stepper and servo PWBs. Programming and operating control over digital copier 10 is accomplished through touch dialog screen 42 of UI 11. The operating software includes application software for implementing and coordinating operation of system components.

Floppy disk port 38 provides program loading access to UIM core PWB 18 for the purpose of entering changes to the operating software, loading specific programs, such as diagnostic programs, and retrieving stored data, such as machine history data and fault data, using floppy disks. Hard disk 36 is used as a non-volatile memory (NVM) to store programs, machine physical data and specific machine identity information. One of the programs hard disk 36 may store is image quality analysis software that forms an image quality analysis module 70 used by the invention.

UIM core PWB 18 communicates with video engine 40 for driving a suitable visual display 42, such as a CRT or flat screen of the user interface 11. The UIM core 18 also has connected thereto a control panel I/O processor 44 and a generic accessories interface I/O processor 46. The interface I/O processor 46 is in turn connected to a modem PWB 48. The modem 48 provides communication between digital copier 10 and a communications channel, such as a public switched telephone network 50 to facilitate information transfer to and from a remote diagnostic computer 60, which may also include image quality analysis module 70 as well as other diagnostic modules.

The information from the subsystem cores flows to and from the UIM core PWB 18, which embodies software control systems including a user interface system manager and a user interface manager. The UI system manager includes a UI display manager subsystem for controlling the display of messages on the display 42. A data manager subsystem provides data management to the UI system manager.

Figure 3A:
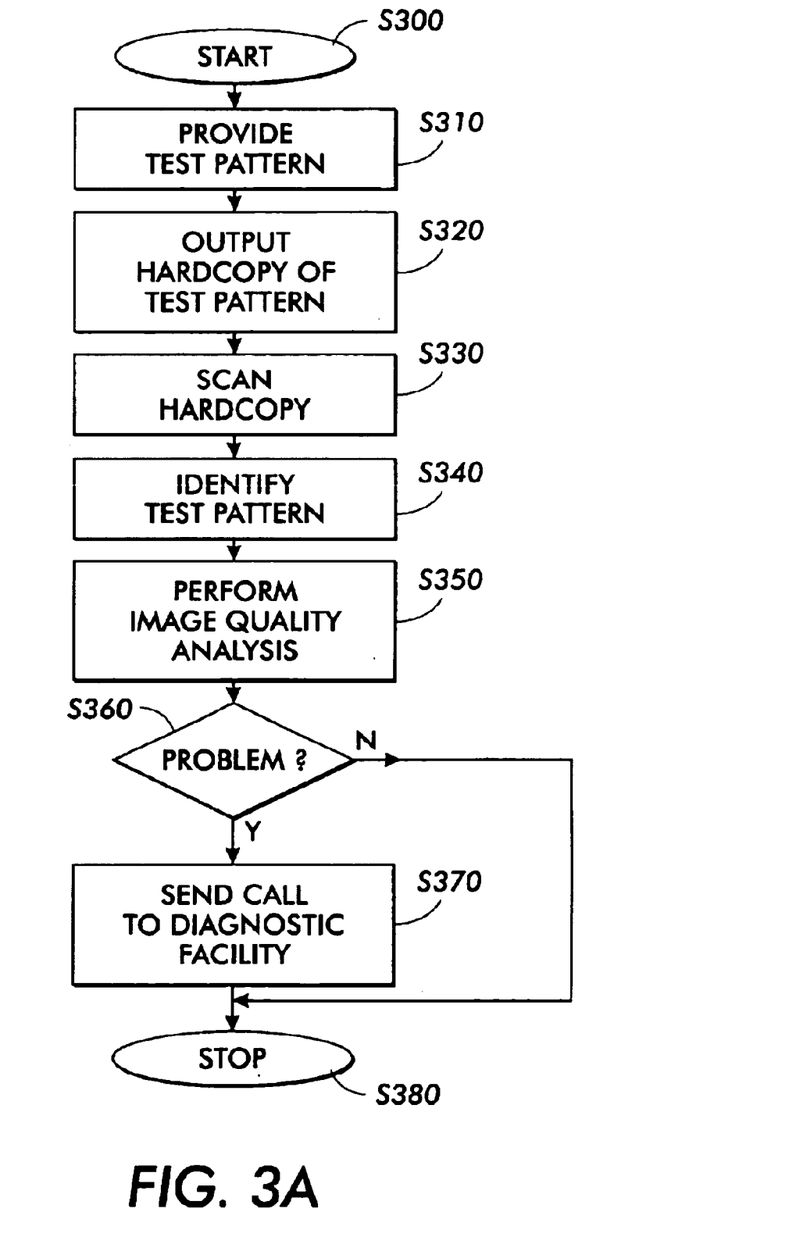
FIG. 3A is a flow chart showing an image analysis method according to the invention.
Figure 3B:
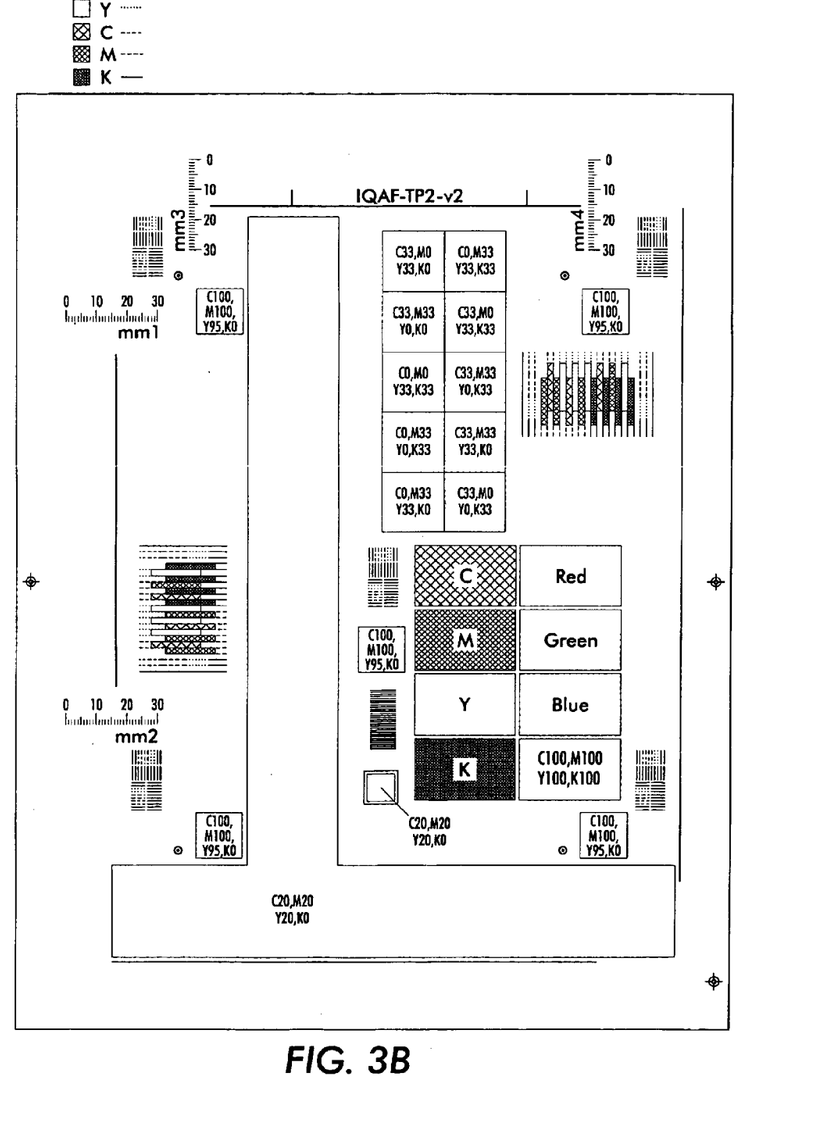
FIG. 3B is an exemplary digital test pattern used by the invention, including several sub-regions (test targets) that can be used for measurements of specific aspects of image quality.

In a first embodiment of the invention, image quality analysis is performed by the process set forth in the flow chart of FIG. 3. The process starts at step S300 and advances to step S310 where at least one specific test pattern, which is in digital form stored in memory 36 in the case of testing a print path and which is in hardcopy original form in case of testing a copy path, is provided. An exemplary test pattern is illustrated in FIG. 3B and will be described in more detail later. If necessary, multiple different test patterns are sequentially used to analyze various components relevant to absolute image quality. Flow then proceeds to step S320 where a corresponding hardcopy output of the test pattern is generated. This can be done by outputting a printed hardcopy output from output station 26 using the digital test pattern as an input when the test pattern is stored in digital form, such as in hard disk 36 or floppy disk 38. Alternatively, an accurate original hardcopy test pattern may be placed at scanner 20 and copied by the digital copier 10 to form the hardcopy output. Then, flow advances to step S330 where the hardcopy output is scanned by scanner 20 to form a digital raster image for analysis purposes.

After step S330, flow advances to step S340 where the digital image is acted on by pattern recognition software, which is either separate from, or coupled with, the image quality analysis module 70, to determine a precise location of various test elements within the scanned digital raster image. This software uses a Hough or similar transform to automatically detect locator marks on the image, relative to which the test elements can be located. A suitable pattern recognition system for use with the invention can be found in U.S. Pat. No. 5,642,202 to Williams et al., owned by the assignee of the present invention, the disclosure of which is incorporated herein by reference in its entirety. After such locator marks are properly detected to determine the position and orientation of various test elements of the digital raster image, the process flows to step S350 where image quality analysis is performed on the test digital raster image using an image quality analysis module 70.

From step S350, flow advances to step S360 where a determination is made by the image quality analysis module 70 whether the image quality for this particular test image is acceptable and whether further analysis by a diagnostic facility is desirable. If it is, flow advances to step S380. However, if the image quality is not acceptable, flow advances from step S360 to step S370 where a call can be made to a diagnostic facility. This call may be an automatic service call made through modem 48 for scheduling an actual service visit by a service technician to correct the noted problems. Alternatively, it may be a call to a more sophisticated diagnostic module 80 located locally or at the remote facility that can further analyze the image quality problem along with values from various sensors and settings on the copier 10. This would provide corrective feedback to the digital copier 10, such as through modem 48 when module 80 is remotely located, allowing the digital copier 20 to adjust itself within acceptable parameters.

Alternatively, or in addition, the results from step S350 may be provided to the copier user, to a service department, or stored locally on a hard disk, for the purpose of monitoring the image quality.

The decision whether to take action in order to correct a problem, which is either present or predicted to occur in the near future, can be based on a number of factors. One such factor is the degree of absolute image quality degradation of one or more aspects of image quality. Other such factors are values from machine sensors and settings. A third category of such factors are user image quality acceptability thresholds. Different users will typically have different thresholds for what degree of image quality degradation is acceptable, and through the monitoring of image quality, which is one of the possible functions of the invention, the specific user threshold can be determined, and used to decide when corrective action will be required for this particular copier/printer. For example, the past history of service calls initiated by the user, can be coupled with past results from image quality monitoring, to determine such thresholds for various aspects of image quality. The time when the image quality degradation exceeds the acceptable level can be predicted, and corrective action scheduled to take place in advance.

The test pattern can be one of several test patterns designed to provide evaluation of one or more parameters relevant to the image quality of the output of the printing system, such as color registration, motion quality, micro and macro uniformity, color correction, and text quality. This analysis is performed using models of human visual perception so that those differences that would be perceived by a human observer can be determined. That is, rather than having the analysis merely compare a scanned image to an original or to determine some level of variation or deviation from a given norm that may or may not rise to the level of a perceived image quality issue when viewed by a human observer, the image quality analysis utilizes human visual perception models. At a simple level, this can be achieved by passing the image through a band-pass filter known to be similar in resolution to that achieved by a human vision system. More sophisticated modeling can also be used. According to preferred aspects of the invention, the results are preferably made to be independent of the marking technology, and of the scanner used to acquire the digital raster image for analysis, so results can be compared across product and model lines with a standard system of measurement and evaluation. An exemplary system and method to achieve this can be found in co-pending U.S. Ser. No. 09/450,183 to Rasmussen et al., filed concurrently herewith, entitled "Method to Obtain Consistent Image Quality Measurements From Different Image Input Devices", the subject matter of which is incorporated by reference herein in its entirety. In this co-pending application, a Modulation Transfer Function (MTF) is determined for a particular input device (scanner 20) and a Visual Transfer Function (VTF) is similarly expressed to take into account the sensitivity of the human visual system (HVS), which is usually lower from that of the typical input device. A Differential Transfer Function (DTF) can then be calculated at each spatial frequency reflecting the ratio of VTF to MTF. The scanned digital test image is then transformed according to the DTF to transform (mainly blur) the image to some extent from that achieved by the scanner such that this transformed image represents the image perceived by the human vision system (HVS).

Various image analysis techniques are then applied to this modified and device independent image to measure certain pertinent image quality attributes, such as graininess and line darkness.

Figure 4:
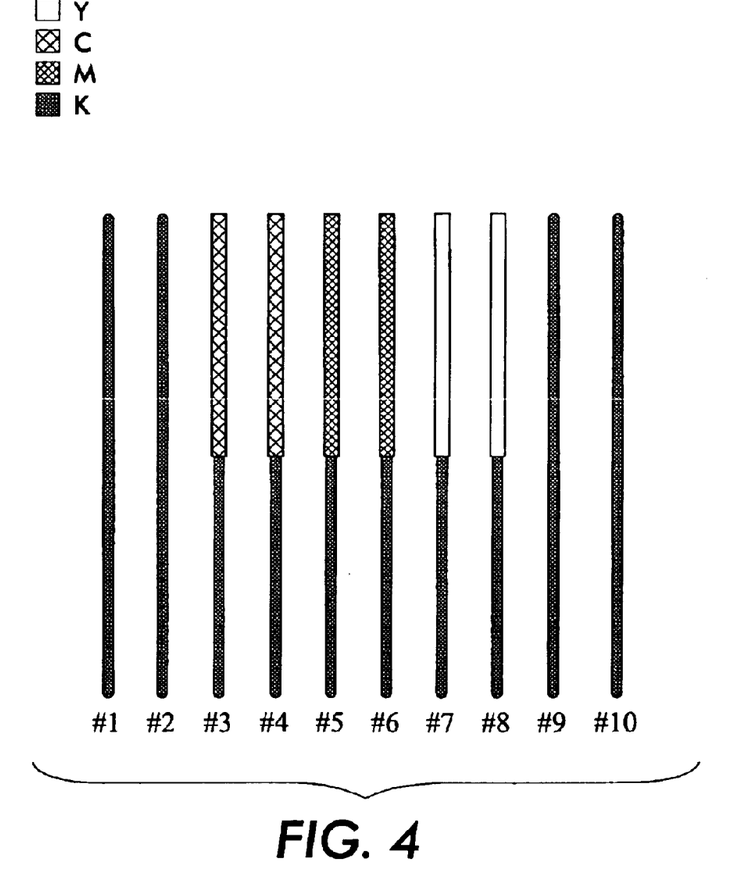
FIG. 4 is an enlargement of one exemplary region of the digital test pattern shown in FIG. 3B.
Figure 5:
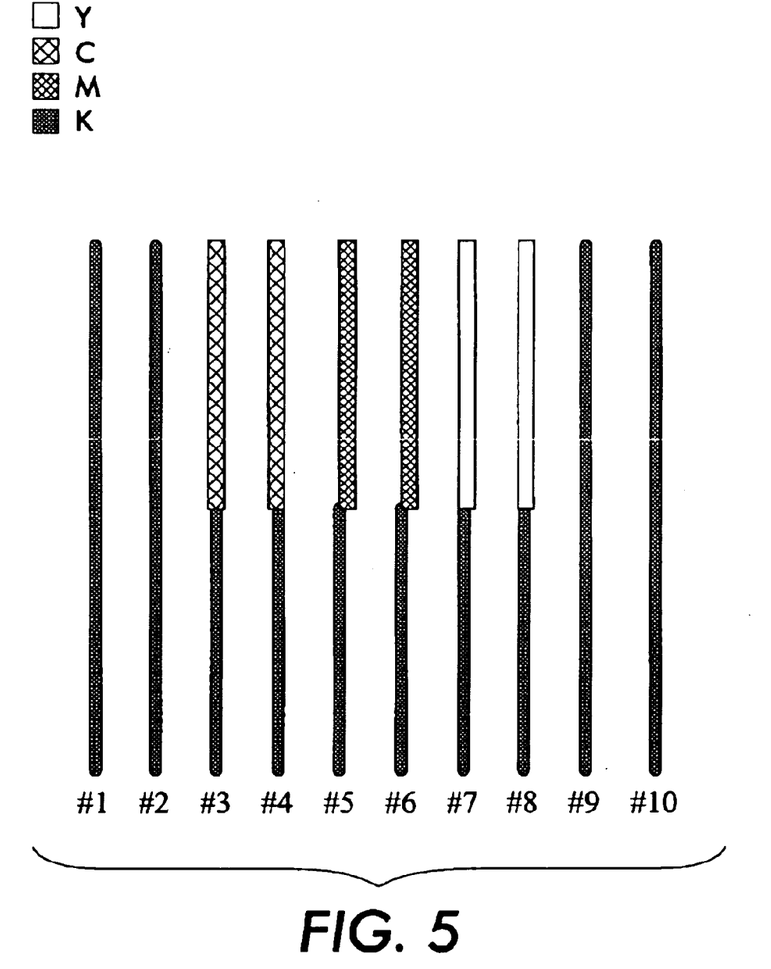
FIG. 5 is an exemplary enlargement of output from the digital copier based on the digital test target of FIG. 4.

The exact implementation of the human visual filtering, incorporating the compensation for scanner MTF, will vary between different image quality metrics, and some metrics may not need any human visual filtering. For example, the test element may be a color pattern with a series of lines to accurately determine color—color registration measurements. One example of such a test element can be found in co-pending U.S. Ser. No. 09/450,181 to Rasmussen et al., filed concurrently herewith, entitled "Technique for Accurate Color—Color Registration Measurement", the subject matter of which is incorporated by reference herein in its entirety. This test element is reproduced as FIG. 4 and has 10 line positions (named line#1 through line#10 from left to right) and is separated into an upper and a lower part. The 10 lines in the lower part are black (K) only. The upper part has lines in each of Black (K), Cyan (C), Magenta (M) and Yellow (Y) representing the four primary colors used in a CMYK printer. FIG. 5 is an example of the hardcopy output from copier 10 based on the test element.

The technique determines the registration of each of C, M, and Y relative to K. That is, C-K, M-K, and Y-K measurements are independent. In the case of C-K measurements, two reflectance profiles, using the red channel of the scanner 20, are taken across the upper and lower parts of the image.

From these profiles the centroids of the K and C lines are calculated. The offset between the centroid of upper(C) line #3 and lower(K) line #3 is a measure of the C-K misregistration, but also includes a contribution due to skew of the image. The offset between the centroid of upper(K) line #1 and lower(K) line#1 is a measure of the skew. By subtracting the two offsets, a skew-independent measure of the C-K misregistration is obtained. The M-K and Y-K registration error are determined in similar fashions, using green and blue scanner channels respectively.

As this test element and quality analysis procedure rely only on a very small part of the image, they do not require the high accuracy of absolute measurements over larger distances. Moreover, as the registrations of each of C, M, and Y relative to K are done independently using the channels R, G, and B, respectively, the results are not affected by the registration of the R, G, B channels of the measurement device.

Another exemplary test pattern and analysis suitable for determining pixel placement accuracy to a high precision can be found in co-pending U.S. Ser. No. 09/450,184 to Dalal et al., filed concurrently herewith, entitled "Quantification of Motion Quality Effect on Image Quality", the subject matter of which is incorporated by reference herein in its entirety.

Furthermore, as an example where incorporation of models for human visual perception is critical, a test element and analysis may be used to distinguish and categorize various non-uniformities. Such an exemplary analysis can be found in co-pending U.S. Ser. No. 09/450,180 to Rasmussen et al., filed concurrently herewith, entitled "Image Processing Method for Characterization of Uniformity of Printed Images", the subject matter of which is incorporated by reference herein in its entirety. Other test elements can be used to determine quality of font reproduction. An example of such can be found in co-pending U.S. Ser. No. 09/450,177 to Rasmussen et al., filed concurrently herewith, entitled "Outline Font For Analytical Assessment of Printed Text Quality", the subject matter of which is incorporated by reference herein in its entirety.

One way of assisting the automation of the image quality analysis is by providing scripts for each test pattern. For example, the memory associated with the image quality analysis module may be provided with a set of files, each containing a script which defines both the positions of test elements within a test pattern, and the sequence of analysis routines to be conducted for a particular test pattern. Moreover, the image analysis system may contain routines to perform bar code reading, optical character recognition or other methods to decipher the identifying information that is embedded into the test pattern. A more detailed description of such a scripted test pattern can be found in co-pending U.S. Ser. No. 09/450,182 to Rasmussen et al., filed concurrently herewith, entitled "Method to allow automated image quality analysis of arbitrary test patterns", the subject matter of which is incorporated by reference herein in its entirety.

According to preferred aspects of the invention the scanned digital raster image may be passed through image processing steps which has the effect of simulating the processing done by the human visual system, such that results can be obtained that correlate with quality as seen by a human observer. In order to apply such processing, it is important that the digital raster image be calibrated into suitable visual color spaces, such as CIELab. The scanned image is typically represented in the form of uncalibrated RGB, and is thus not in a suitable color space. Techniques which can be used to convert RGB images into well-defined color spaces, such as CIELab, are well known. For example, ICC profiles can be used to define such color transformation, for example using look-up tables and interpolation. The required transformation depends upon characteristics of input scanner, including illumination and spectral sensitivities, however, it also depends on the spectral characteristics of the printed test images that are to be analyzed, in particular it depends on the substrate and inks. To be able to correctly perform the initial color transformation, from RGB to a visual color space, the image analysis system must therefore be able to correctly select the proper color calibration data, such as an ICC profile or look-up table, that corresponds to the material being analyzed. Given a finite set of printers and substrates and a given scanner, the color calibration data for all relevant combinations need be created only once (and could be supplied with the printer/copier/scanner). However, the image quality analysis system must be able to automatically select between these color calibration data. To solve this problem, a method similar to that described in relation to selecting a script that specifies the desired analysis sequence, can be employed. In the case of a printer, the printer can impose an annotation on the printed test image, which identifies the required color calibration, and which can be detected automatically, for example by using OCR techniques. The detected color calibration identification can then be interpreted by the image quality analysis system, which can automatically select the required color calibration data file.

The image quality analysis according to this invention is preferably performed with as much automation as possible to reduce the amount of human involvement with the process. In the case of a digital copier or reprographic machine, such as machine 10 having both an output station and a scanner station, analysis can be initiated automatically by the image quality analysis module 70, which can be stored within hard disk 36, for example. That is, the image quality analysis module 70 may operate as a self-executing program either initialized at start-up or after a predetermined period of use or number of copies made, such that module 70 causes the test pattern to be printed by output section 26 and then causes the hardcopy output therefrom scanned by scanner section 20. This can be achieved in an automated fashion, for example, by having the print output of the station 26 linked to the scanner station 20 input, as in U.S. Pat. No. 5,884,118 to Mestha et al., owned by the assignee of the present invention, the disclosure of which is incorporated herein by reference in its entirety.

However, in the case where one or more stand-alone printers or copiers 10A, 10B are being tested which do not incorporate an integral scanner, scanning can be achieved with a stand-alone scanner 20 loosely associated with printer 10A or copier 10B or even completely separate therefrom. In the case of exemplary FIG. 6, scanner 20 is associated with a personal computer 60 containing image quality analysis module 70 and both printer 10A and copier 10B are connected to computer 60. However, this is not necessary as once the hardcopy is output from printer 10A or copier 10B to be tested, they are no longer needed so the scanner 20 and module 70 can be located at any remote facility. Another exemplary configuration involves a multi-function device (copier/scanner/printer/fax) connected with a personal computer, where the personal computer contains the image analysis system, and the multi-function device can be controlled from the personal computer and can act as the input scanner for image analysis.

Figure 6:
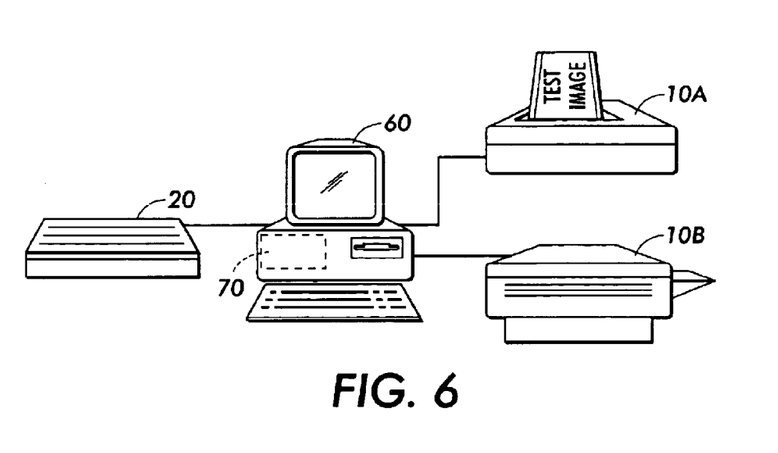
FIG. 6 is a printer with associated hardware to provide image quality analysis on the printer according to the invention.

In the FIG. 6 embodiment, it will be necessary for an operator to be at least partially involved. For example, even if automatic starting of the routine is achieved, a user will be necessary to transport the hardcopy output from the printer 10A or copier 10B to the stand-alone scanner 20 that is associated with the image quality analysis module 70. Also, as a user is needed anyway, such an embodiment may have a manual start activated by depression of a diagnostic key, screen or icon located on the printer 10 or computer 60 to generate the hardcopy output. Alternatively, in the case of a copier 10B being tested, the test pattern may be stored in hardcopy form. In this case, a user may merely make a hardcopy output using the copier and then take the hardcopy output and scan it into scanner 20. Then, a manual start operation can be initiated, such as through a keystroke from personal computer 60.

Systems that can perform image quality analysis on printed test samples can be used in a variety of ways to provide solutions and value to users of printing systems, such as digital printers and copiers. For example, this can form an analysis engine for automatic and/or remote diagnosis of print quality problems, or for monitoring image quality as part of a print quality assurance system. Moreover, upon determination of image quality results from the image quality analysis module 70, the system may further include a local expert system 80 residing on the printer or copier 10 itself or residing on a local personal computer (PC) connected to the printer or copier. The expert system 80 can receive the image quality test results and, based on these results and status of various sensors and hardware on the copier machine, determine a likely failure mode that caused the perceived degradation of image quality and possible remedies to restore the quality to its intended level. Additionally, an even more sophisticated remote diagnostic expert system may be provided at the remote service station within diagnostic computer 60. In those instances where diagnosis cannot be performed, small image regions of interest from the test elements can be transmitted to the remote expert system to reduce transmission expense while providing adequate information from which testing and diagnosis can be achieved.

The present invention has been described with reference to specific embodiments, which are intended to be illustrative and non-limiting. Various modifications can be made to the invention without departing from the spirit and scope of the invention as defined by the appended claims.

What is claimed is:

1. An image quality analysis system for an image output device, comprising:
    a test pattern pertinent to image quality determination;
    a scanner that scans a hardcopy test image, which has been generated by the output device based on the test pattern, to form a digital raster image; and
    an image quality analysis module that receives the digital raster image, distinguishes one or more test targets from the digital raster image, and performs image quality analysis on the test targets to obtain results quantifying image quality,
    wherein the image quality analysis module includes a human visual filter that filters the test targets so that the test targets are similar in resolution to that perceivable by a human visual system and wherein the image quality analysis module identifies image quality deviations that correlate with image quality deviations perceivable by the human observer.

2. The image quality analysis system of claim 1, wherein the image quality analysis module resides locally at a site of the image output device.

3. The image quality analysis system of claim 2, wherein the image output device is a copier that contains the scanner.

4. The image quality analysis system of claim 1, wherein the scanner and the image quality analysis module reside remote from the image output device.

5. The image quality analysis system of claim 1, wherein the test pattern is stored in memory at the image output device.

6. The image quality analysis system of claim 1, wherein the image output device is a copier having an input scanner section serving as the scanner and an output printer section, and the test pattern is in the form of a hardcopy printout that is subsequently scanned into the input scanner section and output as the hardcopy test image.

7. The image quality analysis system of claim 1, further comprising a communication module that connects the image quality analysis module to a remote facility and the results of the image quality analysis are transmitted to the remote facility through the communication module.

8. The image quality analysis system of claim 7, wherein the remote facility includes a diagnostic module that returns information pertinent to correcting any undesirable image quality test results.

9. The image quality analysis system of claim 1, wherein the image quality results are independent of the particular image output device or scanner used, such that comparisons of results can be made between differing image output devices.

10. The image quality analysis system of claim 1, wherein the image quality analysis module determines whether corrective action is needed for the image output device based on the correlated results so that corrective action takes into account human perceivable image quality traits.

11. A method of performing image quality analysis on an image output device having an output station that generates a hardcopy image from a digital image, the method comprising:
    generating a hardcopy image output from the image output device based on a predetermined test pattern;
    scanning the hardcopy image using a scanner to form a digital raster image;
    identifying test targets within the digital raster image using pattern recognition software;
    filtering the test targets using a human visual perception model so that the test targets have a resolution similar to that perceivable by a human visual system; and
    performing image quality analysis on the human visual perception model filtered test targets so that the image quality analysis identifies image quality results that correlate with image quality deviations perceivable by a human observer.

12. The method of claim 11, further comprising a step of sending a communication to a service facility.

13. The method of claim 12, wherein the communication is a service call if the image quality results as less than desirable.

14. The method of claim 12, wherein the communication is the transfer of the image quality results to the service facility.

15. The method of claim 14, further comprising the steps of analyzing the results along with predetermined image output device operating parameters and communicating information to the image output device relevant to correcting the undesirable image quality.

16. The method of claim 11, wherein the image output device is a copier that contains the scanner.

17. The method of claim 11, wherein the method is automatically initiated by the copier at a predetermined time.

18. The method of claim 11, wherein the steps of scanning and analyzing are performed remote from the image output device.

19. The method of claim 11, wherein the image quality analysis module determines whether corrective action is needed for the image output device based on the correlated results so that corrective action takes into account human perceivable image quality traits.

20. An image quality analysis system for an image output device, comprising:

a test pattern pertinent to image quality determination;

a scanner that scans a hardcopy test image, which has been generated by the output device based on the test pattern, to form a digital raster image; and an image quality analysis module that receives the digital raster image, distinguishes one or more test targets from the digital raster image, and performs image quality analysis on the test targets to obtain results quantifying image quality, wherein the image quality analysis module includes a human visual filter that filters the test targets so that the test targets are similar in resolution to that perceivable by a human visual system, the image quality analysis module identifies image quality deviations that correlate with image quality deviations perceivable by the human observer, wherein the image quality analysis module obtains a specific user threshold representing a degree of image quality degradation acceptable to the specific user, and wherein the image quality analysis results are based on this specific user threshold.

21. The image quality analysis system of claim 20, wherein the image quality analysis module determines whether corrective action is needed for the image output device based on the specific user threshold.

22. A method of performing image quality analysis on an image output device having an output station that generates a hardcopy image from a digital image, the method comprising:

generating a hardcopy image output from the image output device based on a predetermined test pattern;

scanning the hardcopy image using a scanner to form a digital raster image;

identifying test targets within the digital raster image using pattern recognition software;

filtering the test targets using a human visual perception model so that the test targets have a resolution similar to that perceivable by a human visual system; and obtaining a specific user threshold representing a degree of image quality degradation acceptable to the specific user; and performing image quality analysis on the human visual perception model filtered test targets so that the image quality analysis identifies image quality results that correlate with image quality deviations perceivable by a human observer, wherein the step of performing image quality analysis results is based on this specific user threshold.

23. The method of claim 22, further comprising a step of determining when corrective action is needed for the image output device based on the specific user threshold.

* * * * *